Dec. 13, 1938.   L. S. CHANCELLOR   2,140,127
CRANKSHAFT
Filed Nov. 27, 1937   2 Sheets-Sheet 2
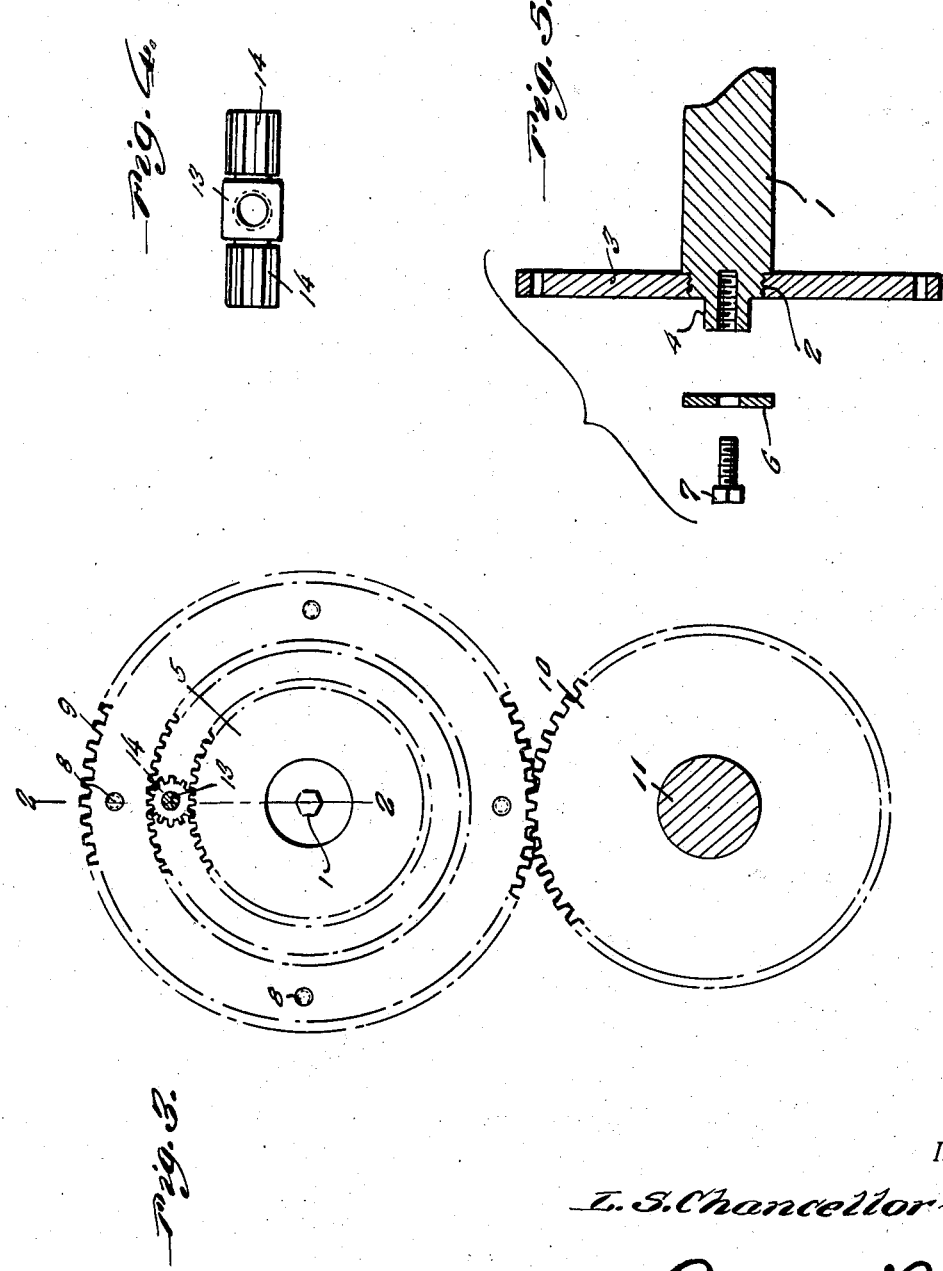
Inventor
L. S. Chancellor
By Clarence A. O'Brien
Hyman Berman
Attorneys Patented Dec. 13, 1938

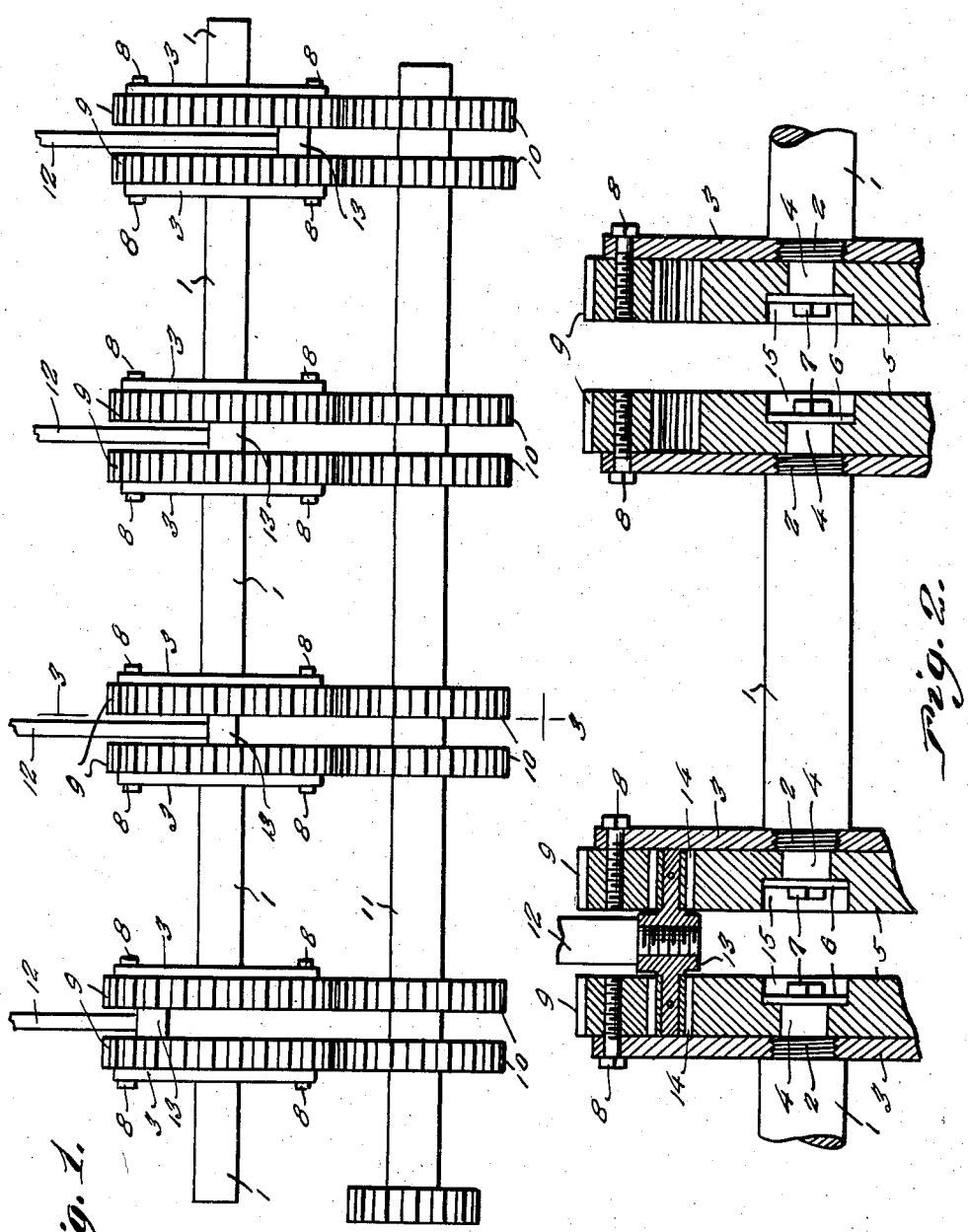

2,140,127

UNITED STATES PATENT OFFICE 2,140,127

CRANKSHAFT

Lihu S. Chancellor, Pleasantgrove, Miss.

Application November 27, 1937, Serial No. 176,865

3 Claims. (Cl. 74—52)

The present invention relates to new and useful improvements in crank shafts particularly for the internal combustion engines of automobiles and has for its primary object to provide, in a manner as hereinafter set forth, a construction and arrangement which is such that friction and vibration will be substantially eliminated or materially reduced, thereby promoting efficiency and prolonging the life of the engine.

Other objects of the invention are to provide a crank shaft of the aforementioned character which will be comparatively simple in construction, strong, durable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the invention.

Figure 2 is a fragmentary view in vertical longitudinal section, taken substantially on the line 2—2 of Fig. 3.

Figure 3 is a cross sectional view taken substantially on the line 3—3 of Fig. 1.

Figure 4 is a detail view in plan of one of the connecting rod pins and the pinion gears thereon.

Figure 5 is a view in vertical longitudinal section through an end portion of one of the shaft sections and the disc mounted thereon, together with the securing bolt and washer which are shown separated.

Referring now to the drawings in detail, it will be seen that the embodiment of the invention which has been illustrated comprises a plurality of longitudinally aligned shaft sections 1 of suitable metal which, as shown to advantage in Fig. 2 of the drawings, are spaced from each other. The shaft sections 1 are provided with reduced portions 2 on which metallic discs 3 are threaded. Then, the shaft sections 1 terminate in further reduced end portions 4 on which gears 5 are loosely mounted and held by lock washers 6 and stud bolts 7.

Secured by stud bolts 8 on the opposed faces of the discs 3 and spaced concentrically from the gears 5 are ring gears 9 having internal and external teeth. The external teeth of the ring gears 9 are in mesh with gears 10 which are fixed on a main drive shaft 11. The reference numeral 12 designates connecting rods having detachably secured in any suitable manner on their lower ends wrist pins or the like 13. Fixed on the end portions of the pins 13 are pinion gears 14 which travel between the gears 5 and 9 and mesh therewith. This is clearly shown in Figs. 2 and 3 of the drawings.

It is thought that the operation of the invention will be readily apparent from a consideration of the foregoing but it may be briefly stated as follows.

As the connecting rods 12 are actuated by the pistons (not shown) in the usual manner, the fixed pinion gears 14 travel around the idle gears 5 and push the ring gears 9. If the pinion gears 4 have twelve teeth, for example, and the ring gears 9 have sixty internal teeth, said gears 9 will rotate twelve teeth less than a revolution for each cycle of the connecting rods. Thus, the gears 9 will lose one revolution for every five cycles of the connecting rods.

The ring gears 9 in turn, actuate the gears 10 fixed on the main drive shaft 11. It will thus be seen that the principal function of the gears 5 is to maintain the pinions 14 in engagement with the inner teeth of the ring gears 9. The gears 5 are countersunk, as at 15, to accommodate the lock washers 6 and the stud bolts 7.

It is believed that the many advantages of a crank shaft constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A device of the class described comprising a main shaft, pairs of gears fixed on said main shaft, a plurality of longitudinally spaced aligned shaft sections mounted parallel to the first named shaft, gears loosely mounted on the end portions of said shaft sections, ring gears fixedly mounted on the end portions of the shaft sections in spaced, concentric relation to the loosely mounted gears, said ring gears including internal and external teeth, the external teeth being engaged with the first named gears, a plurality of connecting rods, pins mounted on said connecting rods, and gears fixed on said pins and adapted to travel between the loosely mounted gears and the ring gears in mesh therewith.

2. A device of the class described comprising a plurality of longitudinally aligned, spaced shaft sections, discs threadedly mounted on the end portions of said shaft sections, gears loosely mounted on the end portions of the shaft sections immediately adjacent the discs, ring gears fixedly mounted on the discs in spaced, concentric relation to the first named gears, wrist pins having their end portions extending between the first and second named gears, and pinion gears fixed on said wrist pins and meshed with said first and second named gears.

3. A device of the class described comprising a main drive shaft, pairs of gears fixed on said drive shaft, a plurality of longitudinally spaced, aligned shaft sections mounted in spaced parallelism to the drive shaft, said shaft sections including reduced threaded portions, discs threadedly mounted on said reduced threaded portions, said shaft sections also including further reduced end portions, gears loosely mounted on said further reduced end portions immediately adjacent the discs, ring gears fixed on the opposed faces of the discs in spaced, concentric relation to the loosely mounted gears and including internal and external teeth, the the external teeth being engaged with the first named gears on the drive shaft, wrist pins extending between the loosely mounted gears and the ring gears, and pinion gears fixed on the end portions of said wrist pins and in mesh with the loosely mounted gears and with the internal teeth of the ring gears.

LIHU S. CHANCELLOR.